United States Patent Office 3,418,361
Patented Dec. 24, 1968

3,418,361
PREPARATION OF AROMATIC HYDROXY COMPOUNDS AND THEIR ESTERS
Warren W. Kaeding, Concord, Calif., and Guy Robert Collins, Midland, Mich., assignors to The Dow Chemical Company, Midland, Mich., a corporation of Delaware
No Drawing. Filed June 19, 1964, Ser. No. 376,584
17 Claims. (Cl. 260—476)

ABSTRACT OF THE DISCLOSURE

The cupric salt of an organic carboxylic acid reacts under substantially aprotic conditions at elevated temperature with a ring hydrogen substituent of a carbocyclic aromatic compound to replace that hydrogen atom with the carboxylate group, thereby forming the carboxylate ester of the corresponding hydroxy aromatic compound. Hydrolysis of the ester yields the free hydroxy aromatic compound.

---

The present invention relates to a new process for attaching an organic carboxylate group to an aromatic hydrocarbon nucleus. It relates particularly to a process for making a carboxylic acid ester of an aromatic hydroxy compound by the direct oxidation of an aromatic carbocyclic ring.

Several processes have been described in recent years whereby phenol is produced by a series of reactions beginning with the oxidation of an aromatic hydrocarbon. These processes begin with a partial oxidation of an alkyl substituent on a benzene ring and the intermediate compound thereby obtained is further reacted in one or more steps to produce a phenol, the residue of the originally oxidized alkyl substituent being removed from the aromatic ring in the process. For example, in one type of commercial process, cumene is oxidized to the hydroperoxide and this is decomposed to form phenol and acetone. In another process, toluene is oxidized to benzoic acid and the benzoic acid is further oxidized and decomposed in the presence of copper to produce phenol. Variants of this latter process are described in U.S. Patents by Kaeding et al., Re. 24,848, Barnard et al., 2,852,567; and Toland, 2,762,838.

These prior art methods begin with the oxidation of an alkyl substituent on the aromatic ring. A method has now been found whereby a carbon atom in an aromatic ring is partially oxidized to produce an ester of the hydroxy aromatic compound by direct introduction of an acyloxy or aroyloxy group onto the ring carbon atom. It has been discovered that when the normal cupric salt of a carboxylic acid is contacted with an aromatic hydrocarbon or substituted aromatic hydrocarbon having at least one ring hydrogen substituent in a substantially aprotic liquid medium at a temperature of about 180–300° C., preferably at 200–275° C., a reaction occurs in which the copper is reduced to the cuprous state and the aromatic reactant is substituted with at least one acyloxy or aroyloxy group to form the aromatic carboxylate. Hydrolysis of the ester yields the corresponding hydroxylated aromatic reactant. The byproduct cuprous salt is readily reoxidized to the cupric state by contacting the reaction mixture with oxygen in the presence of free carboxylic acid. This reoxidation is preferably, but not necessarily, done at a temperature below about 200° C.

By the term "aprotic medium" as used above is meant in the substantial absence of a substance capable of donating a proton, i.e., an active hydrogen-containing substance such as an acid, a non-tertiary amine, a phenol, an alcohol, a thiol, or water.

The principal reaction believed to be taking place in the process i.e., the attachment of an acyloxy or aroyloxy group to the ring of the aromatic reactant, which is the essence of the present invention, is shown in simplified form in the following equation:

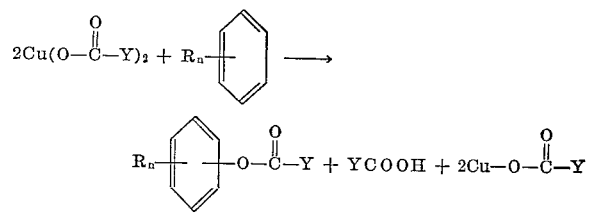

wherein Y represents an aprotic organic group, each R is an unreactive aprotic substituent, n is an integer from zero to five, and two or more R's may be joined to form a fused ring system, the aromatic reactant thereby becoming a naphthalene, a phenanthrene, an indane, or other such compound. The formula YCOOH represents carboxylic acids such as benzoic, toluic, methoxybenzoic, fluorobenzoic, nitrobenzoic, phenylbenzoic, cyclohexane-carboxylic, acetic, 2-ethylhexanoic, methoxyacetic, phenylacetic, and similar acids having no substituent which would make their normal cupric salt a protic substance. Similarly R represents groups such as alkyl, alkoxy, acyloxy, aroyloxy, acyl, aralkyl, aryloxy, aryl, aroyloxy carbonyl or acyloxycarbonyl (where the aromatic reactant is an acid anhydride), or other such radicals with or without aprotic substituents. Two or more R's may join to form an alkylene or an alkenylene radical. Inorganic salts are excluded.

The initial product of the reaction is the carboxylic acid ester of the monohydroxylated aromatic reactant, this compound having the formula

Where a reactive position remains on the ring of this reaction product, further reaction can take place in the same way to form the corresponding esters of the polyhydroxylated compound. The reaction can serve, therefore, as a method for making di and tri hydroxy compounds as well as monohydric phenols, naphthols, and the like.

Because the reactants and the reaction conditions are similar to those used in processes described in the cited Kaeding et al., Barnard et al., and Toland patents, this new method is particularly adapted for incorporation in existing plants designed to use those processes.

The reaction as shown above is in contrast to the reaction which occurs when a cupric benzoate is heated in a protic medium, for example, in benzoic acid solution. In this reaction, where the proton-donating acid is present in substantial quantity, a salicylate is formed as a transitory intermediate which decarboxylates in the acid solution to form a phenyl benzoate or a phenol. Such a sequence of reactions is shown by Kaeding et al., Re. 24,848, and this forms the basis of a process for converting a benzoic acid to a phenol.

The present process is also distinguished from the pyrolysis of a basic cupric benzoate wherein there is hydroxylation of the benzoate to form a salicylate. This process is described by Kaeding et al., J. Org. Chem., 27, 3551 (1962). Basic cupric carboxylates are not aprotic substances within the present description, for their structure contains a free hydroxyl group and they do not react with aprotic benzenes and other aprotic aromatics as do the normal salts.

The proportion of reactants is not critical to success of the present process. However, it is usually preferable to employ the aromatic reactant in substantial excess over the quantity theoretically required to react with the cupric carboxylate.

Since the reaction of a cupric carboxylate with an aromatic aprotic substrate as shown in the above reaction produces free acid, a small amount of decarboxylation may take place depending on the amount of protic substance present, and some of the phenol or the phenyl ester of the acid may be present as minor byproducts in the reaction mixtures produced by the present process. This side reaction is minimized by maintaining the concentration of free acid in the reaction mixture at as low a level as possible during operation at usual process temperatures, that is, at 200° C. or above. Preferably, free acid is substantially absent under these conditions. This can be accomplished by periodic addition of cupric ion, preferably in the form of an inorganic copper compound such as a carbonate, oxide, or hydroxide. Such addition is best done after first cooling the reaction mixture below the usual process temperature range, that is, below about 200° C. and removing the water of reaction from the mixture by distillation before resuming process conditions, since water is a protic substance and interferes in the process to the extent that it is present.

Regeneration of the cupric carboxylate reagent by contacting the reaction mixture with an oxygen-containing gas and some free carboxylic acid can constitute a feature of continuous operation of the process. Similarly, the presence in the reaction mixture of excess cupric oxide supplies added oxidizing power which increases the yield of the ester product.

Inert, aprotic solvents, such as alkanes, cycloalkanes, aliphatic ethers, or benzenes having no aromatic hydrogen atoms such as hexamethylbenzene can be employed as diluents in the reaction mixture if desired, but their use is not usually advantageous.

The phenolic product of the reaction, which is present in the reaction mixture as an ester, can be separated by any of a number of conventional procedures for handling such mixtures, for example, distillation or solvent extraction. Alternatively, the mixture may be saponified and the free phenol separated by one of the above means, by crystallization, or other known procedure.

Detailed descriptions of process operation and product separation methods are contained in the experimental procedure and the examples which follow. Additional applications and modifications of the present process will be apparent to those skilled in the art.

The following general experimental procedure and work-up was employed when using aprotic aromatic reactants with boiling points higher than the process temperature. The reactor was a vertical cylindrical glass vessel of about 300 ml. operating volume and having electrical temperature control and measuring means. An inlet tube extending to the bottom of the reactor permitted bubbling a gas through the contents for agitation, purging, or oxidation. The outlet at the top of the reactor was connected to a downward air condenser and suitable traps.

The cupric salt was formed in the reactor by dissolving the carboxylic acid in the aromatic reactant, heating to 150–200° C. and adding a mole equivalent amount of basic cupric carbonate (corresponding to the formula $2CuCO_3 \cdot Cu(OH)_2$). A rapid stream of nitrogen admitted through the gas inlet tube provided agitation and a protective nitrogen blanket and also swept out the carbon dioxide and water which were formed.

In some cases, copper in excess of that necessary to form the cupric salt was added and this was present in the reaction mixture as cupric oxide. The resulting anhydrous solution or suspension of cupric salt was then heated at 200–260° C. until the blue or green color of the normal cupric salt had disappeared. This reaction was usually complete in a few minutes. Higher conversions were obtained by adding more basic cupric carbonate, after cooling the reaction mixture below 200° C. and repeating the heating cycle.

After completion of the reaction, the mixture was cooled, diluted with ether, and filtered. The solids, which were primarily cuprous salts, were washed with ether and the combined ether filtrates were extracted with a very small quantity of dilute hydrochloric acid to remove the copper present in traces of dissolved copper salts. The ether solution was then extracted with saturated aqueous sodium bicarbonate solution to separate dissolved free carboxylic acids. These free acids were recovered by acidification of the aqueous bicarbonate solution and extraction with methylene chloride. The remaining ether solution contained carboxylic acid esters and unchanged aromatic reactant. These components were separated by distillation and their amounts were estimated by means of analytical and preparative gas-liquid chromatography techniques. The copper salts filtered from the original ether solution of the reaction mixture were reslurried in ether and decomposed by saturating the ether with anhydrous hydrogen chloride. Copper chloride and free carboxylic acids were recovered from the resulting mixture.

EXAMPLE 1

By the procedure described above, a solution of 50 g. of benzoic acid in 300 g. of diphenyl ether was reacted at 180° C. with 35 g. of basic cupric carbonate and the resulting blue slurry of cupric benzoate was heated at 250° C. for 8 minutes, becoming a copper-colored suspension as a result. The mixture was cooled to 180° C., 25 g. of benzoic acid and 25 g. of basic cupric carbonate were added as above, the mixture was swept with nitrogen to remove water of reaction, and the product was heated 8 minutes at 260° C. After cooling again to 180° C., a final 25 g. portion of basic cupric carbonate was added to the reaction mixture and the temperature was raised again to 260° C. where it was held for 14 minutes. The resulting dull copper-colored slurry was very viscous. About 13 ml. of water had been collected in the cold traps during the course of the reaction.

From the separation procedure outlined above there was obtained from the reaction mixture 76 g. of cuprous chloride, 258 g. of recovered diphenyl ether, and 30.2 g. of high boiling oil. This oil was found to consist essentially of the benzoic acid esters of mono and dihydroxylated diphenyl ethers, primarily the meta and para isomers.

EXAMPLE 2

A mixture of 1.1 g. moles of diphenyl ether and 0.257 g. mole of recrystallized (from acetone) normal cupric benzoate was heated at 250–265° C. for 30 minutes. The product was worked up as described above and it was found to contain 0.071 g. mole of esters of benzoic acid with meta and para hydroxy diphenyl ethers.

EXAMPLE 3

Substantially as shown in Example 1, a reaction mixture formed by heating together 50 g. of p-toluic acid, 292 g. of diphenyl ether, and a total of 90 g. of basic cupric carbonate was reacted at 250–260° C. for 90 minutes. The reaction product yielded 24.2 g. of high boiling neutral material which consisted essentially of esters of p-toluic acid with mixed hydroxydiphenyl ethers, largely of meta and para orientation.

EXAMPLE 4

In the same way, a mixture of 0.24 g. mole of m-nitrobenzoic acid and 1.67 g. moles of diphenyl ether was reacted with 0.57 g. mole of basic cupric carbonate and this was heated at about 260° C. for 40 minutes. The product contained 0.126 g. mole of esters of meta and para hydroxylated diphenyl ethers with m-nitrobenzoic acid.

Example 5 illustrates the application of the present process to the preparation of a dihydroxybenzene or derivative thereof by the reaction of a phenyl ester with a cupric carboxylate.

EXAMPLE 5

By the foregoing general procedure, 70 g. of benzoic acid, 275 g. of phenyl benzoate, and 75 g. of basic cupric carbonate were combined at 180° C. and the anhydrous product was heated at 250° C. for 45 minutes. The reaction product contained 227 g. of unreacted phenyl benzoate and 25.6 g. of a higher boiling neutral oil. The neutral oil was distilled under reduced pressure to yield 19 g. of material boiling at 150-250° C./2 mm. When acetone was added to this distillate, 1.5 g. of crystalline hydroquinone dibenzoate separated. Hexane was added to the heated remaining acetone solution and from the oil that separated on cooling, 2.7 g. of resorcinol dibenzoate was crystallized. The remaining mother liquor was largely a solution of these two dibenzoates.

EXAMPLE 6

In a sealed tube, an anhydrous mixture of 15 g. of normal cupric benzoate (equivalent to 98 g. millimoles of benzoic acid) and 75 g. of naphthalene was heated at 250° C. for ten minutes. Analysis of the reaction mixture showed the presence of 4.8 mm. (g. millimoles) of 1-naphthyl benzoate and 8.1 mm. of 2-naphthyl benzoate.

Example 7 illustrates a method whereby the reaction may be run in a continuous fashion by reoxidizing the cuprous compounds substantially as they are formed by contacting the reaction mixture with a dry oxygen-containing gas.

EXAMPLE 7

The reactor was similar to that described in Example 1 except that its operating volume was about 1.5 liters. A one inch diameter Oldershaw column was connected to the upper part of the reactor, thereby permitting the separation of non-condensable gases, water, and a small amount of the reaction media from the reactor liquids. A mixture of 1275 g. of diphenyl ether and 250 g. of benzoic acid was put in the reactor and this was reacted at 190° C. with 118 g. of basic cupric carbonate, utilizing a stream of nitrogen for agitation and to remove the water and carbon dioxide byproducts from the reaction mixture. The anhydrous reaction mixture was then heated for ten minutes at 230° C. under a nitrogen blanket, whereupon the slurry changed in color from blue to a coppery shade. The nitrogen was then shut off and a stream of dry air was bubbled through the reaction mixture at 230° C. for 1.4 hours at a rate of 4 liters per minute. The mixture was cooled and worked up as previously described. A total of 3.8 g. of water had been condensed from the effluent gas during the air treatment. The reaction product yielded 128.6 g. of the benzoate of phenoxyphenol and 34.1 g. of the dibenzoate of dihydroxydiphenyl ether. The orientation of the phenoxyphenol ester was 53.1% meta, 32.0% para, and the remainder was ortho. Similar orientation was found in the dibenzoate of the dihydroxydiphenyl ether.

In commercial operation of the process as described in Example 7, true continuous operation would additionally include incremental addition of both the cupric benzoate and the aprotic medium and corresponding withdrawal of liquid reaction mixture under conditions such that at no time would there be present in the reaction mixture any significant quantity of the free benzoic acid at the reaction temperature. One method of accomplishing this condition would include reducing the temperature of the reaction mixture below 200° C. while the benzoic acid was being added and raising the temperature again to 200-300° C. after the acid had been converted to cupric benzoate and water of reaction had been essentially removed. Advantageously, the byproduct cuprous benzoate is reoxidized to the cupric salt by contacting the reaction mixture with air or oxygen and an equivalent of free acid during the addition of reactants or at other such stage of the process as is convenient.

EXAMPLE 8

By the general procedure of Example 7, 500 g. of cupric acetate monohydrate was added to 1600 g. of diphenyl ether at a temperature of 180-250° C. The bulk of the addition took place in the temperature range of 240-250° C. over a 30 minute period of time. The slurry was heated for an additional 30 minutes after the addition was complete. The acetic acid was distilled out of the reactor liquid as it was produced and collected in the overhead product receiver.

After cooling, the solid (primarily cuprous acetate) was filtered off. The remaining amber fluid was distilled to give 1500 g. of diphenyl ether, 14 g. of o-acetoxydiphenyl ether, 43 g. of a mixture of meta and para-acetoxydiphenyl ether and 10 g. of di and poly acetoxylated diphenyl ether. Two hundred grams of acetic acid was recovered from the overhead distillate.

EXAMPLE 9

A mixture of 15 g. of cupric benzoate and 75 ml. of o-xylene was heated in a sealed tube at 250° C. for 10 minutes. Analysis of the reaction product indicated the presence of 0.87 g. of 2,3-xylyl benzoate and 1.39 g. of 3,4-xylyl benzoate.

EXAMPLE 10

In a similar manner, 15 g. of cupric benzoate and 75 ml. of m-xylene were heated at 250° C. for 10 minutes. Analysis of the reaction product revealed the presence of 0.12 g. of 2,6-xylyl benzoate, 0.84 g. of 2,4-xylyl benzoate, and 1.19 g. of 3,5-xylyl benzoate.

EXAMPLE 11

In a similar manner, 15 g. of cupric benzoate and 75 ml. of p-xylene were heated at 250° C. for 10 minutes. Analysis of the reaction product revealed the presence of 1.49 g. of 2,5-xylyl benzoate.

EXAMPLE 12

In a similar manner, 5 g. of cupric benzoate and 38 g. of nitrobenzene were heated at 235° C. for 10 minutes. Analysis of the reaction product revealed the presence of 0.14 g. of o-nitrophenyl benzoate, 0.38 g. of m-nitrophenyl benzoate and 0.19 g. of p-nitrophenyl benzoate.

EXAMPLE 13

In a similar manner 15 g. of cupric benzoate and 75 ml. of anisole were heated at 250° C. for 10 minutes. Analysis of the reaction product revealed the presence of 0.46 g. of o-anisyl benzoate, 1.29 g. of m-anisyl benzoate, and 0.28 g. of p-anisyl benzoate.

EXAMPLE 14

In a similar manner, 15 g. of cupric benzoate and 75 ml. of fluorobenzene were heated at 250° C. for 10 minutes. Analysis of the reaction product showed 1.67 g. of a mixture of ortho, meta and para-fluorophenyl benzoate.

EXAMPLE 15

A solution of 300 g. of benzoic anhydride and 50 g. of benzoic acid, maintained at a temperature of 240-260° C. was treated with 85 g. of basic cupric carbonate added stepwise over 40 minutes.

The reaction mass was cooled and treated with ether whereupon cuprous benzoate separated as a white solid and was removed by filtration. The ether filtrate developed a blue color on exposure to air resulting from a reoxidation of a trace of the copper salt. The solution was extracted with aqueous bicarbonate solution and the latter separated and acidified. A mixture of aromatic carboxylic acids separated. A sample of the latter acid mixture was extracted with hot water (95–100°) to remove the benzoic acid. An insoluble oily layer remained. The latter was separated and crystallized from carbon tetrachloride. The first crop was found to be the benzoate ester of p-hydroxybenzoic acid and the next three crops to be primarily the benzoate ester of salicylic acid.

Experiments similar to the above but using aprotic reaction media of relatively low boiling points were run by heating about 5 g. of purified normal cupric benzoate with about 25 ml. of the aprotic solvent in a sealed heavy-walled glass ampule of about 50 ml. capacity. The work-up of the reacted mixture was similar to the procedure previously described with modifications suitable for the handling of smaller quantities. Quantities of the various products were determined by titrimetric and vapor phase chromatographic analysis.

EXAMPLE 16

A mixture of 5.0 g. of cupric benzoate and 25 ml. of benzene was heated in a glass ampule as described above. After 10 minutes at 250° C., the organic portion of the reaction mixture was analyzed after acidification and found to contain 3.5 mm. of phenyl benzoate.

EXAMPLE 17

Example 16 was repeated with the addition to the reaction mixture of 49 mm. of excess cupric oxide. The organic portion of the reaction product contained 5.5 mm. of phenyl benzoate.

EXAMPLE 18

A mixture of 5 g. (16.4 mm.) of cupric benzoate and 25 ml. of toluene was heated at 250° C. for 15 minutes. Upon working up the reaction product as before, it was found to contain 4.11 mm. of tolyl benzoate.

EXAMPLE 19

A mixture of 5 g. of cupric benzoate and 25 ml. of mesitylene was heated at 250° C. for 10 minutes. Analysis of the product as before showed the presence of 0.6 mm. of mesityl benzoate.

We claim:
1. A process for making an organic carboxylic ester which comprises contacting the normal cupric salt of an organic carboxylic acid with an aromatic carbocyclic compound having at least one hydrogen on the aromatic ring under substantially aprotic conditions in the liquid phase at 180–300° C., thereby replacing said hydrogen substituent with the organic carboxylic acid group of said cupric salt to form the corresponding aromatic ester and reducing the cupric salt to the cuprous carboxylate.

2. The process of claim 1 wherein the cuprous carboxylate is reoxidized to the cupric salt by contacting the reaction mixture with oxygen and the free carboxylic acid at the reaction temperature.

3. A process for making a carboxylic acid ester of a hydroxy aromatic compound of the formula

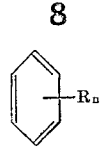

wherein $n$ is an integer from 0–3, and R is a radical of the group methyl, methoxy, nitro, fluoro, phenoxy, benzoyloxy, benzoyloxycarbonyl, or two R's are joined to form a naphthalene ring, which process comprises reacting by contacting a normal cupric carboxylate of the formula $(YCOO)_2Cu$ wherein Y is alkyl of 1–7 carbon atoms, methoxymethyl, benzyl, cyclohexyl, phenyl, tolyl, nitrophenyl, fluorophenyl, methoxyphenyl, or biphenylyl with a compound of the formula

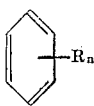

in the liquid phase under substantially aprotic conditions at a temperature of about 180–300° C.

4. The process of claim 3 wherein the ester product is saponified to form the corresponding phenol.

5. The process of claim 3 wherein the ester product is separated from the reaction product.

6. The process of claim 3 wherein the normal cupric carboxylate is cupric acetate.

7. The process of claim 3 wherein the normal cupric carboxylate is cupric benzoate.

8. The process of claim 7 wherein the ester is separated by distillation from the reaction mixture.

9. The process of claim 3 wherein $n$ is zero.

10. The process of claim 3 wherein R is phenoxy.

11. The process of claim 3 wherein R is benzoyloxy.

12. The process of claim 11 wherein $n$ is one.

13. The process of claim 3 wherein R is methyl.

14. The process of claim 13 wherein $n$ is one.

15. The process of claim 3 wherein the formula represents naphthalene.

16. The process of claim 3 wherein R is fluoro and $n$ is one.

17. The process of claim 3 wherein R is nitro and $n$ is one.

No references cited.

LORRAINE A. WEINBERGER, *Primary Examiner.*

T. L. GALLOWAY, *Assistant Examiner.*

U.S. Cl. X.R.

260—438.1, 468, 469, 471, 473, 479, 613, 621, 622